(12) United States Patent
Ozaki et al.

(10) Patent No.: US 8,397,590 B2
(45) Date of Patent: Mar. 19, 2013

(54) BEARING FOR WHEEL WITH SENSOR

(75) Inventors: Takayoshi Ozaki, Iwata (JP); Hiroshi Isobe, Iwata (JP)

(73) Assignee: NTN Corporation, Osaka (JP)

( * ) Notice: Subject to any disclaimer, the term of this patent is extended or adjusted under 35 U.S.C. 154(b) by 322 days.

(21) Appl. No.: 12/735,655

(22) PCT Filed: Jan. 27, 2009

(86) PCT No.: PCT/JP2009/000293
§ 371 (c)(1),
(2), (4) Date: Aug. 5, 2010

(87) PCT Pub. No.: WO2009/098843

PCT Pub. Date: Aug. 13, 2009

(65) Prior Publication Data

US 2010/0318304 A1   Dec. 16, 2010

(30) Foreign Application Priority Data

Feb. 6, 2008   (JP) ................................. 2008-025989

(51) Int. Cl.
*G01L 3/02* (2006.01)
(52) U.S. Cl. .................... 73/862.322; 73/146
(58) Field of Classification Search .................... 73/146, 73/862.321–862.332
See application file for complete search history.

(56) References Cited

U.S. PATENT DOCUMENTS

| | | | | |
|---|---|---|---|---|
| 3,759,344 A | * | 9/1973 | Blee et al. | 180/313 |
| 5,571,056 A | * | 11/1996 | Gilbert | 474/80 |
| 6,619,102 B2 | | 9/2003 | Salou et al. | |
| 6,634,208 B2 | | 10/2003 | Salou et al. | |
| 7,216,551 B2 | * | 5/2007 | Koyagi et al. | 73/862.322 |
| 2002/0012484 A1 | | 1/2002 | Salou et al. | |
| 2002/0061148 A1 | | 5/2002 | Salou et al. | |
| 2009/0097791 A1 | | 4/2009 | Ozaki et al. | |
| 2010/0135604 A1 | | 6/2010 | Ozaki et al. | |

FOREIGN PATENT DOCUMENTS

| | | |
|---|---|---|
| JP | 2002-98138 | 4/2002 |
| JP | 2003-530565 | 10/2003 |
| JP | 2005-48823 | 2/2005 |
| JP | 2007-57299 | 3/2007 |
| JP | 2007-64778 | 3/2007 |

(Continued)

OTHER PUBLICATIONS

International Search Report for PCT/JP2009/000293, mailed Mar. 3, 2009.

(Continued)

*Primary Examiner* — Max Noori (57) ABSTRACT

A bearing assembly for a vehicle wheel with a sensor in which load acting on the bearing assembly and/or a tread surface is accurately detected is provided. The bearing assembly includes rolling elements between outer and inner members, a load detecting device in one of the outer and inner members provided as a stationary member, for detecting load acting on the bearing assembly, a rotation detecting device for detecting the rotation of the other member provided as a rotating member, an averaging circuit for calculating rotational speed of the rotating member from output of the rotation detecting device, determining from the calculated rotational speed a time period required for the rolling elements to revolve a pitch of arrangement thereof and calculating average value of output of the load detecting device during the period, and an estimating circuit for estimating the load from the average value.

6 Claims, 10 Drawing Sheets

FOREIGN PATENT DOCUMENTS

| | | |
|---|---|---|
| JP | 2007-292158 | 11/2007 |
| WO | 01/77634 A2 | 10/2001 |

OTHER PUBLICATIONS

English Translation of the International Preliminary Report on Patentability mailed Sep. 16, 2010 in corresponding International Patent Application PCT/JP2009/000293.

Japanese Office Action mailed Jul. 3, 2012 issued in corresponding Japanese Patent Application No. 2008-025989.
Japanese Office Action issued Sep. 18, 2012 in corresponding Japanese Patent Application No. 2008-025989.

* cited by examiner

BEARING FOR WHEEL WITH SENSOR

CROSS REFERENCE TO THE RELATED APPLICATIONS

This application claims the benefit under 35 U.S.C. Section 371 of PCT International Application No. PCT/JP2009/000293, filed Jan. 27, 2009, which claimed priority to Japanese patent application No. 2008-025989, filed Feb. 6, 2008, the entire disclosures of which are herein incorporated by reference as a part of this application.

BACKGROUND OF THE INVENTION

1. Field of the Invention

The present invention relates to a sensor equipped wheel support bearing assembly, specifically a bearing for a vehicle wheel with a sensor, of a type having a load sensor built therein for detecting a load imposed on a bearing unit for a vehicle wheel.

2. Description of the Related Art

As a technique to detect a load imposed on each of vehicle wheels of an automotive vehicle, the sensor equipped wheel support bearing assembly has been suggested, in which the load is detected by detecting a strain occurring in a flange outer diametric surface of an outer ring, which is a stationary ring, of the wheel support bearing assembly. (See, for example, the Patent Document 1 listed below.) The wheel support bearing assembly of a type having a strain gauge pasted to an outer ring of the wheel support bearing assembly for detecting the strain has also been suggested. (See, for example, the Patent Document 2 listed below.)

Further, the sensor equipped wheel support bearing assembly has been suggested, in which a sensor unit made up of a strain generating member and a strain sensor fitted to this strain generating member is fitted to the stationary ring of the bearing unit, which strain generating member includes a contact fixing segment at least two locations relative to the stationary ring and has a cutout defined at least one location between the neighboring contact fixing segments, with the strain sensor arranged in this cutout. (See, for example, the Patent Document 3 listed below.)

According to the sensor equipped wheel support bearing assembly disclosed in the Patent Document 3, since when the load acts on a rotatable ring incident to travel of the automotive vehicle, the stationary ring is deformed through rolling elements, such deformation brings a strain in the sensor unit. The strain sensor provided in the sensor unit detects such strain in the sensor unit. If relations between strains and loads are determined beforehand by means of a series of experiments and/or simulations, the load or the like acting on the vehicle wheel can be detected from an output of the strain sensor.

[Patent Document 1] JP Laid-open Patent Publication No. 2002-098138
[Patent Document 2] JP Laid-open Patent Publication No. 2003-530565
[Patent Document 3] JP Laid-open Patent Publication No. 2007-057299

SUMMARY OF THE INVENTION

According to the technique disclosed in the Patent Document 1, only the strain generated as a result of deformation of a flange of the stationary ring is detected. A problem has, however, been found that since the deformation of the flange of the stationary ring is accompanied by a slippage between a flange surface and a knuckle surface in the event that a force exceeding the static frictional force, application of a repeated load tends to result in generation of a hysteresis in the output signal.

Figure 12:
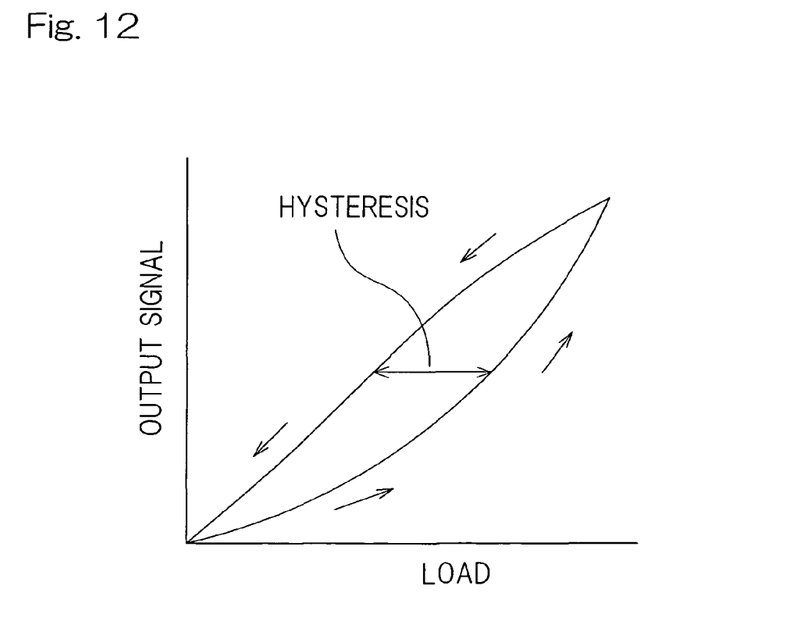
FIG. 12 is an explanatory diagram showing a hysteresis appearing in the output signal in the prior art.

For example, when the load acting in a certain direction relative to the wheel support bearing assembly increases, the slippage between the stationary ring flange surface and the knuckle surface will not occur because the static frictional force is larger than the load at first, but if it exceeds a certain magnitude, it overcomes the static frictional force, accompanied by the slippage. If starting from this condition the load is reduced, no slippage occurs at first, as was expected, because of the static frictional force, but the slippage occurs when it reaches a certain magnitude. As a result, if an attempt is made to estimate the load at a portion where the deformation takes place, such a hysteresis as shown in FIG. 12 appears in the output signal. Once this hysteresis appears, the detecting resolution will be lowered.

Also, in the case where the strain gauge is pasted to the outer ring such as disclosed in the Patent Document 2, a problem has been found in assemblability.

In addition, in the sensor equipped wheel support bearing assembly disclosed in the Patent Document 3, the amplitude of the output signal of the sensor unit tends to increase each time the rolling elements of the wheel support bearing assembly move past in the vicinity of an area of installation of the sensor unit. In other words, the output signal of the sensor unit comes to represent a periodic waveform that is affected by the rolling elements and, therefore, the load cannot be detected with high accuracy.

An object of the present invention is to provide a bearing for a vehicle wheel with a sensor, of a kind, in which the load acting on the wheel support bearing assembly and/or a tire tread surface can be accurately detected without being affected by the rolling elements.

The sensor equipped wheel support bearing assembly of the present invention is a wheel support bearing assembly for rotatably supporting a vehicle wheel relative to a vehicle body structure, which includes an outer member having an inner periphery formed with a plurality of rolling surfaces; an inner member having an outer periphery formed with rolling surfaces opposed to the rolling surface referred to above; a plurality of rows of rolling elements interposed between the respective opposed rolling surfaces defined in the outer and inner members; a load detecting device provided in one of the outer and inner members that serves as a stationary member, for detecting a load imposed on the wheel support bearing assembly; a rotation detecting device for detecting a rotation of the other of the outer and inner members that serves as a rotating member; an averaging circuit for calculating a rotational speed of the rotating member from an output signal of the rotation detecting device, determining from the calculated rotational speed, the time period required for the rolling elements to revolve a pitch of arrangement thereof and calculating an average value of an output signal of the load detecting device over the time period; and an estimating circuit for estimating from a calculated value of the averaging circuit, a load acting on a tire tread surface or a load acting on the wheel support bearing assembly.

When the load acts in the wheel support bearing assembly or between the vehicle wheel tire and the road surface, deformation takes place also in the stationary member (for example, the outer member) of the wheel support bearing assembly as a result of application of such load and, therefore, the load detecting device detects the load in reference to such deformation. Although the output signal of the strain sensor will be affected by the passage of the rolling elements so long as it is left as it stands, the averaging circuit applies the averaging process to such output signal and, therefore, influence brought about by the passage of the rolling elements can be canceled. In this way, the estimating circuit can estimate with high accuracy, the loads (the vertically acting load Fz, the load Fx which is to be the drive force or the braking force, and the axially acting load Fy) acting in the wheel support bearing assembly and between the vehicle wheel tire and the road surface.

In one embodiment of the present invention, the rotation detecting device may include a sensor for use in an anti-lock brake system. In the case of this construction, with no need to employ any extra rotation detecting device to detect the rotation of the rotating member, the averaging process of averaging the output signal of the load detecting device can be performed by the averaging circuit.

In one embodiment of the present invention, the load detecting device may include a sensor unit, the sensor unit comprising a strain generating member, having two or more contact fixing segments fixed to the stationary member in contact therewith, and a strain sensor fitted to the strain generating member for detecting a strain occurring gin the strain generating member, in which case the contact fixing segments are provided in an outer diametric surface of the stationary member so as to assume the same dimensions in a direction axially thereof. In the case of this construction, the strain occurring in the stationary member as a result of the load acting in the wheel support bearing assembly or between the vehicle wheel tire and the road surface can be, after having been amplified, transmitted to the strain generating member of the sensor unit and, therefore, the strain sensor can detect such strain with high sensitivity.

In one embodiment of the present invention, the strain generating member may be in the form of a thin plate member having, when viewed from top, the generally strip shape of a uniform width or similar to the strip shape with its opposite side edge portions each formed with a respective cutouts.

Where the strain generating member is constituted by the thin plate member having a schematic top plan shape representing a strip of a uniform width, the strain generating member can be rendered compact in size and low in cost.

In one embodiment of the present invention, the sensor unit may be arranged at top, bottom, left and right surface areas of an outer diametric surface of the stationary member, which assume respectively top, bottom, left and right positions relative to a tire tread surface. In the case of this construction, the load in a plurality of directions can be estimated. In other words, the vertically acting load Fz and the axially acting load Fy can be estimated from the respective output signals of the two sensor units arranged on the top and bottom surface areas of the outer diametric surface of the stationary member and the load Fx resulting from the drive force and the braking force can be estimated from the respective output signals of the two sensor unit arranged on the left and right surface areas of the outer diametric surface of the stationary member.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will be described in detail with particular reference to FIG. 1 to FIGS. 6A to 6C. This embodiment is a version applied to a wheel support bearing assembly for the support of a vehicle drive wheel, which is of an inner ring rotating model of a third generation type. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
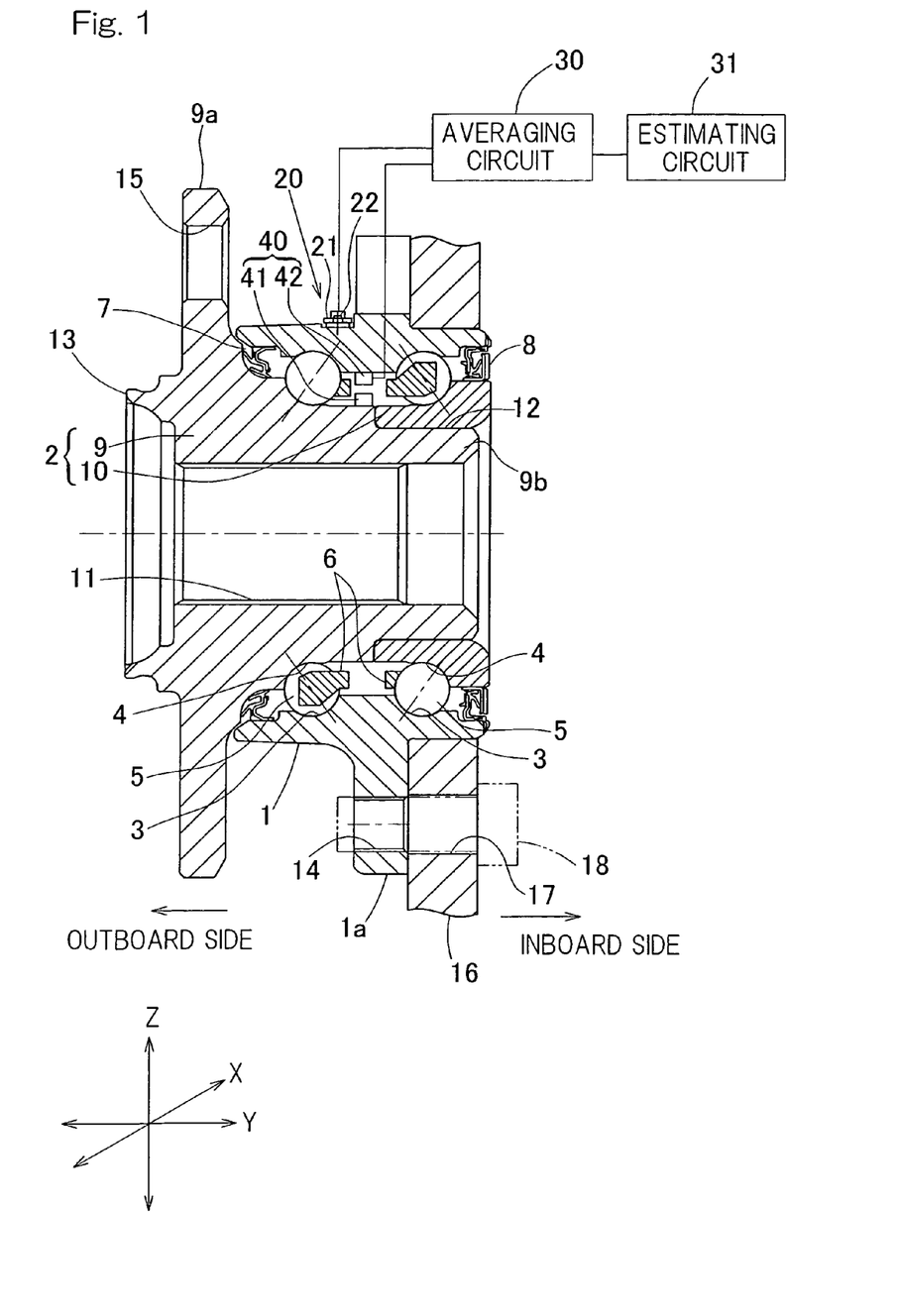
FIG. 1 is a diagram including a sectional view of a sensor equipped wheel support bearing assembly according to a first embodiment of the present invention and a block diagram of a conceptual construction of a detecting system therefor.

A bearing unit in the sensor equipped wheel support bearing assembly includes, as shown in FIG. 1 in a sectional view, an outer member 1 having an inner periphery formed with a plurality of rolling surfaces 3, an inner member 2 having an outer periphery formed with rolling surfaces 4 held in face-to-face relation with the respective rolling surfaces 3, and a plurality of rows of rolling elements 5 interposed between the respective rolling surfaces 3 and 4 of those outer and inner members 1 and 2. This wheel support bearing assembly is rendered to be a double row angular contact ball bearing type, in which the rolling elements 5 are employed in the form of balls and are retained by a retainer 6 employed for each row. The rolling surfaces 3 and 4 referred to above have an arcuate shape in cross-section and are so formed as to represent respective rolling element contact angles that are held in back-to-back relation with each other. Opposite open ends of an annular bearing space delimited between the outer member 1 and the inner member 2 are sealed respectively by outboard and inboard sealing units 7 and 8.

The outer member 1 serves as a stationary member and is of one-piece construction having an outer periphery formed with a vehicle body fitting flange 1a that is secured to a knuckle 16 forming a part of the automobile suspension system (not shown) mounted on an automotive body structure. The flange 1a is provided with knuckle fitting bolt holes 14 at a plurality of circumferential locations thereof for connection with the knuckle and is secured to the knuckle 16 when respective knuckle bolts 18 passing through associated bolt insertion holes 17, defined in the knuckle 16, are threaded from the inboard side into the knuckle fitting holes 14.

The inner member 2 serves as a rotating member and includes a hub axle 9 having a wheel mounting hub flange 9a formed therein, and an inner ring 10 mounted on a portion of an outer periphery of an axle portion 9b of the hub axle 9 adjacent an inboard end thereof. The rolling surfaces 4 of each row referred to above are formed respectively in the hub axle 9 and the inner ring 10. That portion of the hub axle 9 adjacent the inboard end thereof is provided with an inner ring mounting surface area 12 that is radially inwardly stepped to provide a reduced diameter, and the inner ring 10 is mounted on that inner ring mounting surface area 12. The hub axle 9 has a center portion formed with a through hole 11 and the hub flange 9a is provided with a press-fitting hole 15 defined at a plurality of circumferential locations thereof for receiving therein a respective hub bolt (not shown). At a root portion of the hub flange 9a of the hub axle 9, a cylindrical pilot portion 13 for guiding a vehicle wheel and a brake component (not shown) protrudes towards the outboard side.

Figure 2:
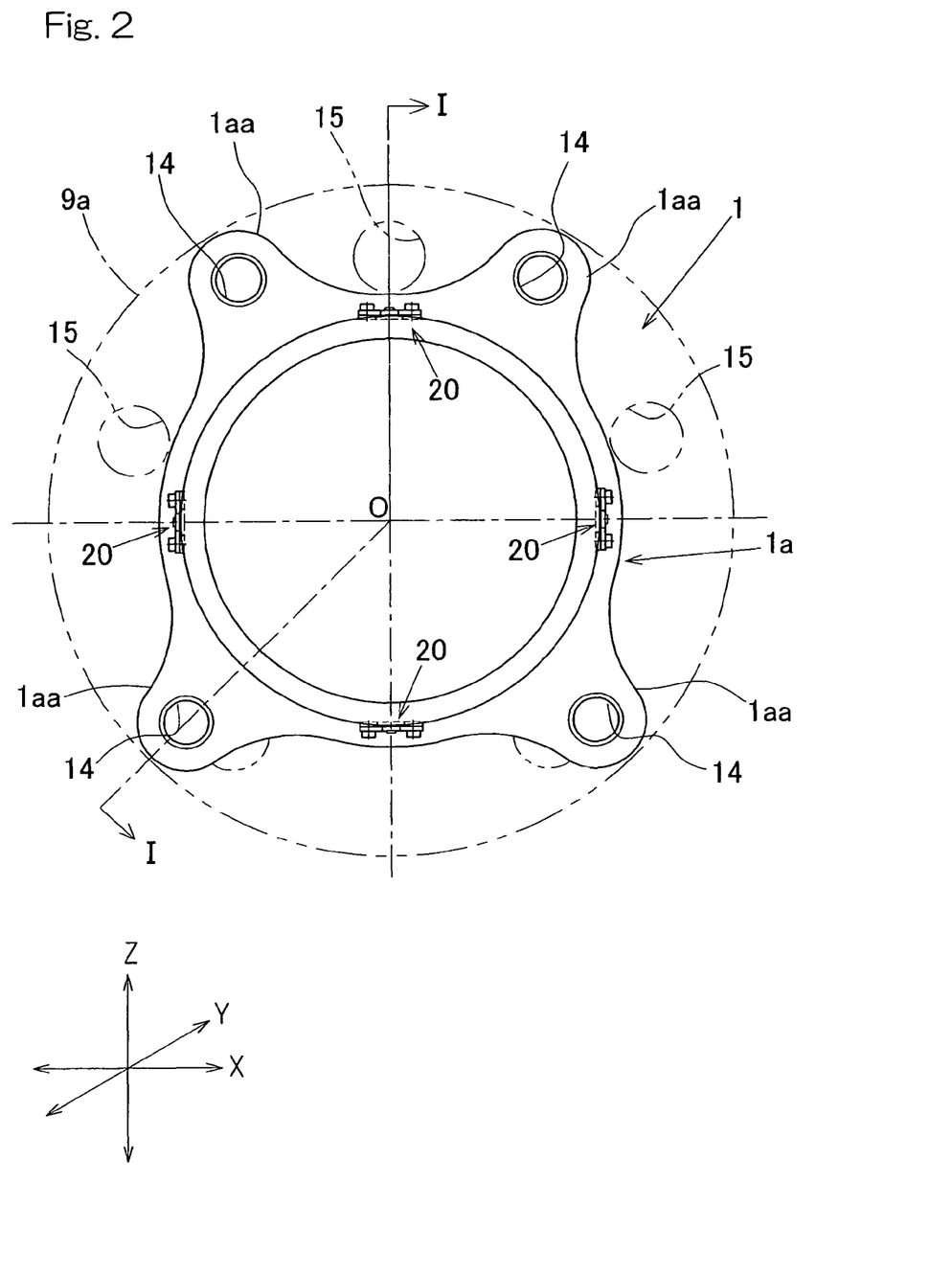
FIG. 2 is a front elevational view showing an outer member of the sensor equipped wheel support bearing assembly as viewed from the outboard side.

FIG. 2 illustrates a front elevational view of the outer member 1 of the wheel support bearing assembly as viewed from the outboard side. It is, however, to be noted that FIG. 1 illustrates a cross-sectional view taken along the line I-I in FIG. 2. As best shown in FIG. 2, the vehicle body fitting flange 1a is in the form of lugs 1aa protruding radially outwardly defined respectively by circumferential portions of such flange 1a, where the associated bolt holes 14 are defined.

An outer diametric surface of the outer member 1, which serves as the stationary member, is provided with four sensor units 20. In the illustrated embodiment, those sensor units 20 are provided respectively at top, bottom, right and left surface portions of the outer diametric surface of the outer member 1, which assume top, bottom, front and rear positions, respectively, relative to the tire tread surface.

Figure 3:
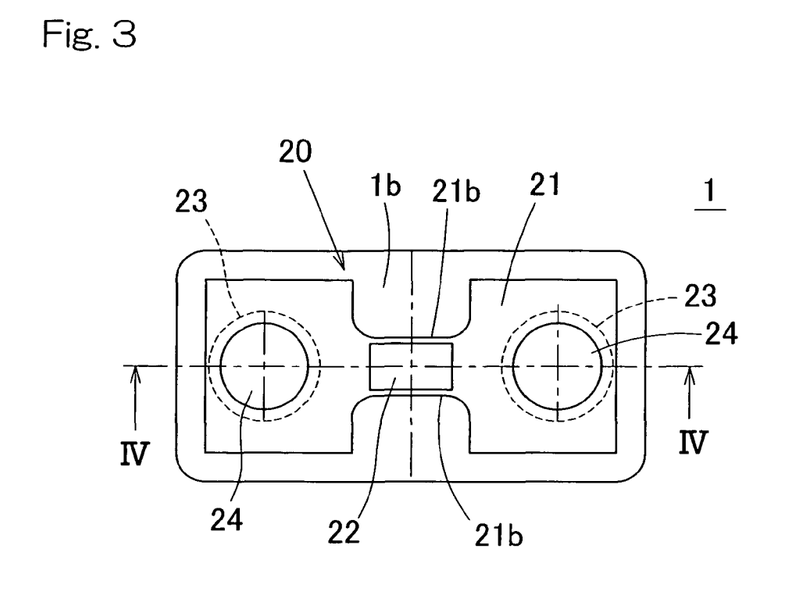
FIG. 3 is an enlarged top plan view showing a sensor unit employed in the sensor equipped wheel support bearing assembly.
Figure 4:
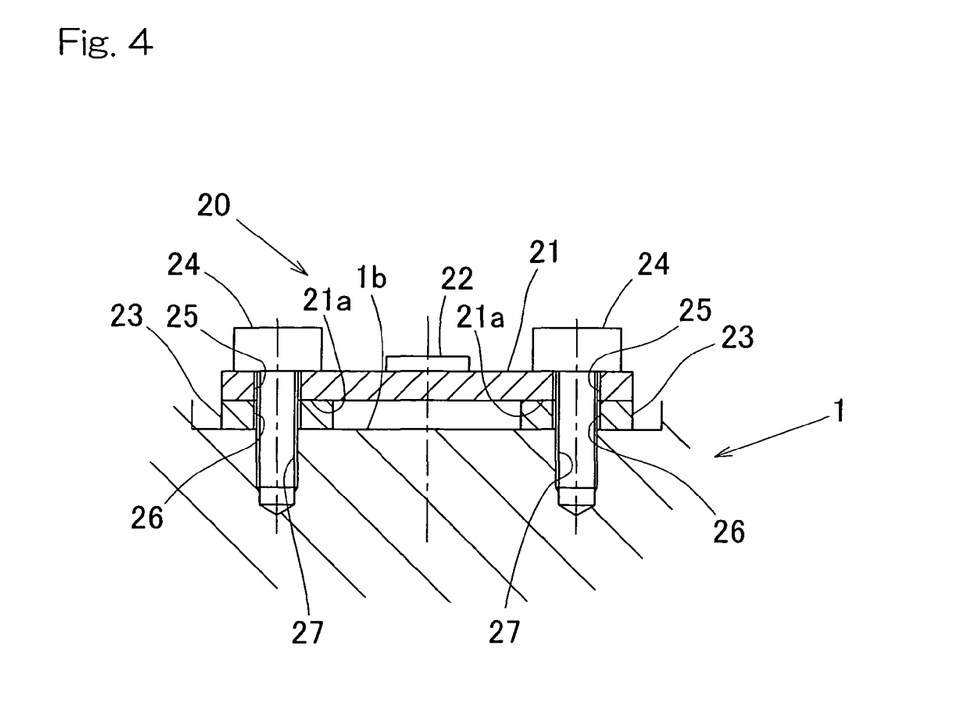
FIG. 4 is a cross sectional view taken along the line IV-IV in FIG. 3.

Each of the sensor units 20 includes, as shown in FIGS. 3 and 4 in an enlarged top plan view and an enlarged sectional view, respectively, a strain generating member 21, and a strain sensor 22 fitted to the strain generating member 21 and operable to detect a strain occurring in the strain generating member 21. The strain generating member 21 is in the form of a thin plate member made of an elastically deformable metallic material such as, for example, steel or the like and having a thickness of not greater than 3 mm, and has, when viewed from top, a generally strip shape having a uniform width over the entire length thereof, and also has a cutout 21b defined in each of the opposite side portions thereof at a location substantially intermediate of the length thereof. Each of the cutouts 21b has corner regions that are so shaped as to represent an arcuately sectioned shape. Also, the strain generating member 21 has its opposite ends provided with two contact fixing segments 21a secured to the outer diametric surface of the outer member 1 through respective spacers 23 in contact with such outer diametric surface of the outer member 1. It is, however, to be noted that depending on the particular shape of the strain generating member 21, it may have two or more contact fixing segments 21a. In addition, the cutouts 21b defined in the strain generating member 21 may be dispensed with. The strain sensor 22 is pasted to a site of the strain generating member 21, at which the strain becomes large relative to the load acting in various directions. In the instance as shown and described, an intermediate portion on the outer surface side of the strain generating member 21, which are sandwiched between the cutouts 21b on the opposite side edge portions of the strain generating member 21 is selected for that site and, accordingly, the strain sensor 22 detects the strain acting in the vicinity of the cutouts 21b in a direction circumferentially of the strain generating member 21. It is to be noted that the strain generating member 21 is preferably of a type that will not undergo any plastic deformation even when as an external force acting on the outer member 1 serving as the stationary member or a working force acting between a vehicle wheel tire and a road surface, the maximum expected force is applied to the outer member 1. If the plastic deformation occurs, deformation of the outer member 1 will not be transmitted to the sensor unit 20 and measurement of the strain will therefore be affected.

The sensor unit 20 referred to hereinabove is so arranged that the two contact fixing segments 21a of the strain generating member 21 employed therein assume respective positions of the same dimension in a direction axially of the outer member 1 with the contact fixing segments 21a located having been spaced from each other in a direction circumferentially of the strain generating member 21, and is fixedly mounted on the outer diametric surface of the outer member 1 with the contact fixing segments 21a fixed to the outer diametric surface of the outer member 1 by means of respective set bolts 24. Each of the set bolts 24 is threaded into a corresponding bolt hole 27, defined in an outer peripheral portion of the outer member 1, after having been passed through a radially extending bolt insertion hole 25, defined in the respective contact fixing segment 21a, and then through a corresponding bolt insertion hole 26 defined in the associated spacer 23. When in this way the contact fixing segments 21a are fixed to the outer diametric surface of the outer member 1 through the associated spacers 23, that intermediate portion of the strain generating member 21, which is in the form of a thin plate member and has the cutouts 21b defined therein, is spaced from the outer diametric surface of the outer member 1, thus allowing a portion of the strain generating member 21 around the cutouts 21b to readily undergo a strain induced deformation. As each of the axial positions where the contact fixing segments 21a are arranged, that axial position which will become perimeters of the outboard row of the rolling surface 3 in the outer member 1, is selected in the instance shown and described. The term "perimeter of the outboard row of the rolling surface 3" referred to above and hereinafter is intended to mean a region extending from a position intermediate between the rolling surfaces 3 on the inboard and outboard sides to a position where the rolling surface 3 on the outboard side is formed. In order to fix the sensor unit 20 to the outer diametric surface of the outer member 1 in a stabilized fashion, those portions of the outer diametric surface of the outer member 1, where the respective spacer 23 are fixed in contact therewith, are formed as flat surface areas 1b.

Figure 5:
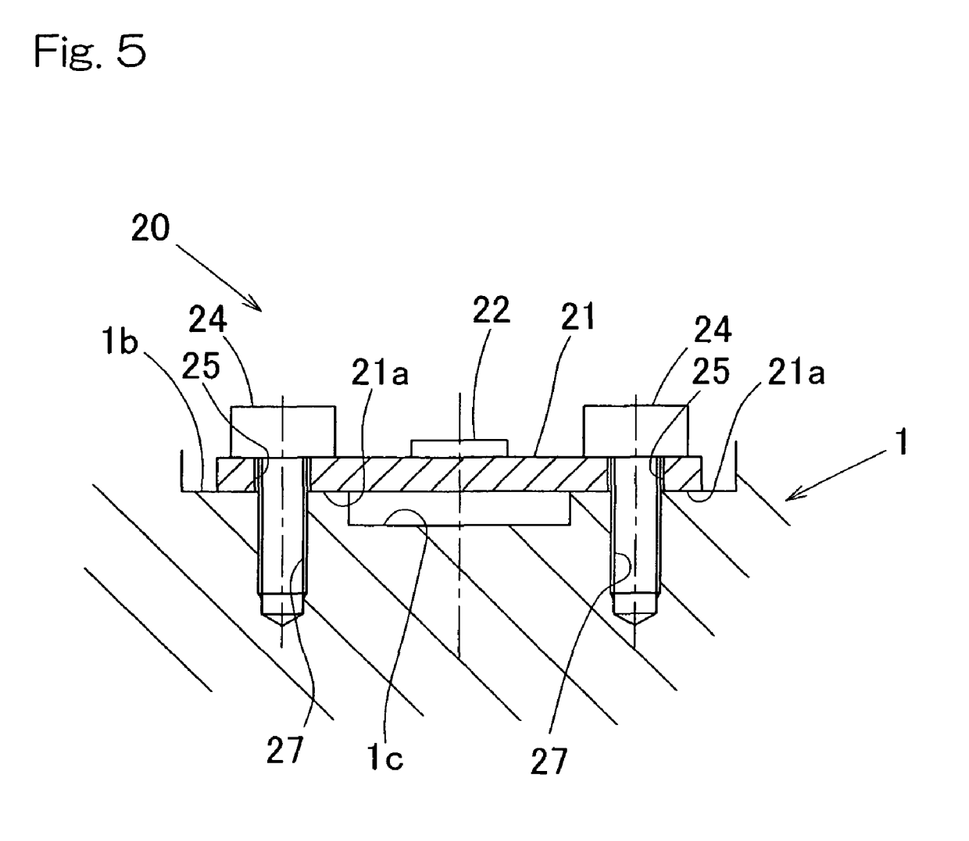
FIG. 5 is a sectional view showing a different example of disposition of the sensor unit.

Alternatively, as best shown in FIG. 5 in a sectional representation, the use of the spacers 23 may be dispensed with and, instead thereof, a groove 1c may be defined in a portion of the outer diametric surface of the outer member 1 intermediate of the respective positions, at which the associated contact fixing segments 21a of the strain generating member 21 are to be fixed, so that that portion of the strain generating member 21 intermediate between the two contact fixing segments 21a, where the cutouts 21b occupy, can be spaced from the outer diametric surface of the outer member 1.

For the strain sensor 22, various other types may be employed. For example, the strain sensor 22 may be employed in the form of a metal foil strain gauge. In such case, fixture is generally carried out to the strain generating member 21 by means of a bonding technique. Also, the strain sensor 22 may be employed in the form of a thick film resistance element formed on the strain generating member 21.

A rotation detector 40 as a rotation detecting device for detecting the rotation of the inner member 2 is provided at the axial intermediate position within the wheel support bearing assembly. This rotation detector 40 is of a radial type and is made up of a pulsar ring 41, which is a sensor target and which is mounted on an outer periphery of the inner member 2, and a magnetic element sensor 42 mounted on the inner periphery of the outer member 1 and opposed radially to the pulsar ring 41. The pulsar ring 41 may be of a type having a periodic magnetic change in a direction circumferentially thereof and may therefore be employed in the form of a multipolar magnet having poles N and S alternating in a direction circumferentially thereof or may be a magnetic element ring having a gear-like serrations arranged in a direction circumferentially thereof. The magnetic element sensor 42 is used to detect a magnetic change of the pulsar ring 41 that rotates together with the inner member 2 and may be employed in the form of a Hall sensor, an MR sensor or an MI sensor.

The strain sensor 22 of the sensor unit 20 and the magnetic element sensor 42 of the rotation detector 40 are connected with an averaging circuit 30. The averaging circuit 30 is operable to average output signals of the strain sensor 22.

Figure 6A:
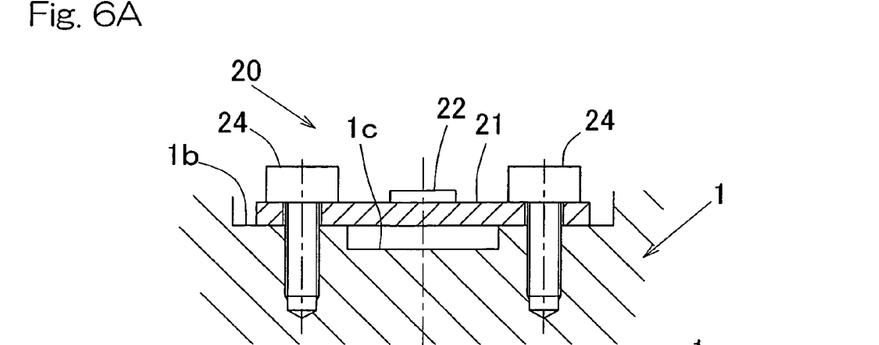
FIGS. 6A to 6C are explanatory diagrams showing how revolution of rolling elements affects on an output signal from the sensor unit.
Figure 6B:
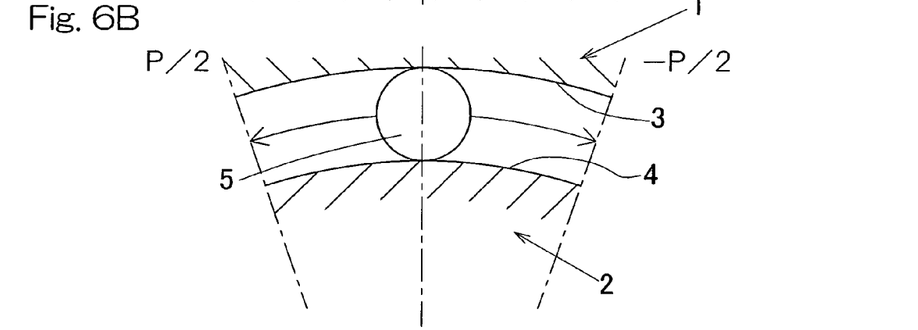
Figure 6C:
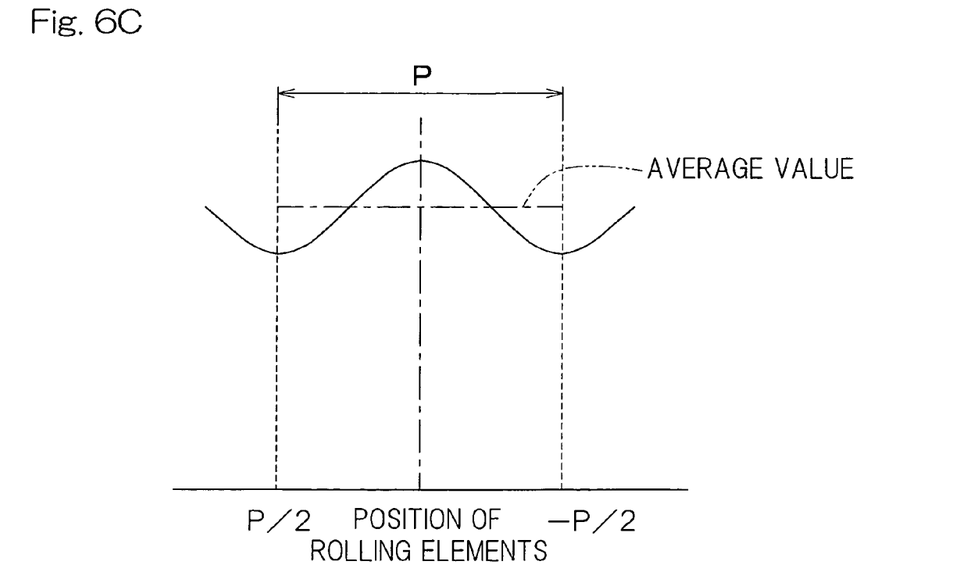

The sensor unit 20 is provided at the axial position which is the perimeter of the outboard row of the rolling surface 3 in the outer member 1 and, therefore, an output of the strain sensor 22 is affected by the rolling elements 5 moving past in the vicinity of an area of installation of the sensor unit 20 as shown in FIGS. 6A to 6C. Specifically, when the rolling elements 5 move past the position nearest to the strain sensor 22 of the sensor unit 20 as shown in FIGS. 6A and 6B, the amplitude of the output signal of the strain sensor 22 attains a peak value and will decrease as the rolling elements 5 move away from that nearest position. Since the rolling elements 5 successively move past in the vicinity of the area of installation of the sensor unit 20 at a predetermined arrangement pitch P, the output of the strain sensor 22 exhibits such a waveform that the amplitude of such output signal periodically changes, as shown by the solid line in FIG. 6C, at the period of the pitch P of arrangement of the rolling elements 5. Accordingly, the averaging circuit 30 is operable to average the amplitude of the output signal at the period of revolution of the rolling elements 5 over a distance corresponding to the pitch P of arrangement thereof as shown by the chain line in FIG. 6C, to thereby cancel the influence brought about by the rolling elements 5. It is to be noted that in FIG. 6A, the sensor unit 20 is assumed to be so constructed as shown in FIG. 5.

An averaging process performed by the averaging circuit 30 is carried out, for example, in a manner which will now be described below. At the outset, the rotational speed of the inner member 2 is calculated from the output signal of the magnetic element sensor 42 of the rotation detector 40 and, from this calculated rotational speed, the time period T required for the rolling elements 5 to revolve a zone of the pitch P of arrangement is calculated. Then, the arithmetic average of the amplitude value of the output signal of the strain sensor 22, which is sampled at a predetermined period t within this time period T is determined. It is to be noted that the sampling period t in this case is to be of a sufficiently short value as compared with the required time period T.

An estimating circuit 31 is provided at a stage subsequent to the averaging circuit 30. The estimating circuit 31 is operable to estimate the force (a vertically acting load Fz, a load Fx which is to be a driving force or a braking force, an axially acting load Fy) acting in the wheel support bearing assembly or between the vehicle wheel and the road surface (the tire tread surface) from the average value of the output signal of the strain sensor 22 determined by the averaging circuit 30 in the manner described hereinabove. This estimating circuit 30 has a relation setting circuit (not shown), in which relations between the vertically acting load Fz, the load Fx which is to be the drive force or the braking force, and the axially acting load Fy and the output signal (already averaged) of the strain sensor 22 are set in an arithmetic equation or table, and is operable with the use of the relation setting circuit to estimate the working force (the vertically acting load Fz, the load Fx which is to be the drive force or the braking force, the axially acting load Fy), from the output signal of the strain sensor 22, which has been averaged. Contents set in the relation setting circuit referred to above are determined and set by means of a series of experiments and/or simulations.

When the load acts between the vehicle wheel tire and the road surface, such load is applied to the outer member 1, which serves as the stationary member of the wheel support bearing assembly, resulting in deformation. Since the two contact fixing segments 21a of the strain generating member 21, having the cutouts 21b, in the sensor unit 20 are fixed to the outer member 1 in contact therewith, the strain appearing in the outer member 1 is, after having been amplified, transmitted to the strain generating member 21 and such strain is subsequently detected by the strain sensor 22 with high sensitivity, to thereby estimate the load from such output signal. In the instance as shown and described above, the vertically acting load Fx and the axially acting load Fy can be estimated from the respective output signals of the two sensor units 20 arranged on the top and bottom surface areas of the outer diametric surface of the outer member 1 and the load Fx brought about by the drive force or the braking force can be estimated from the respective output signals from the two sensor units 20 arranged on the left and right surface areas of the outer diametric surface of the outer member 1.

In such case, the output signal of the strain sensor 22 will be affected by the passage of the rolling elements 5 so long as it is left as it stands, but the averaging circuit 30 applies the averaging process to such output signal and, therefore, influence brought about by the passage of the rolling elements can be canceled. In this way, the estimating circuit 31 can estimate with high accuracy, the loads (the vertically acting load Fz, the load Fx which is to be the drive force or the braking force, and the axially acting load Fy) acting in the wheel support bearing assembly and between the vehicle wheel tire and the road surface.

When the contact fixing segments 21a of the sensor unit 20 that is fixed to the outer diametric surface of the outer member 1 serving as the stationary member have different axial dimensions, the strains transmitted from the outer diametric surface of the outer member 1 to the strain generating member 21 through the respective contact fixing segments 21a are different from each other. In the embodiment hereinabove described, the contact fixing segments 21a of the sensor unit 20 are provided to the outer diametric surface of the outer member 1 so as to assume the same dimensions in the axial direction and, therefore, the strain can be easily concentrated on the strain generating member 21, resulting in an increase of the sensitivity correspondingly.

Also, since in the embodiment hereinabove described, the strain generating member 21 of the sensor unit 20 is employed in the form of a thin plate member having, when viewed from top, the generally strip shape of a uniform width or the generally strip shape with its opposite side edge portions formed with the respective cutouts 21b, the strain appearing in the outer member 1 can be easily transmitted to the strain generating member 21 after having been amplified and the hysteresis tending to appear in the output signal can be reduced, allowing the load to be estimated with high sensitivity. Also, the shape of the strain generating member 21 can be simplified to allow it to be compact in size and low in cost.

Also, since each of the cutouts 21b defined in the strain generating member 21 has its corner area so shaped as to represent the arcuately sectioned shape as hereinbefore described, the strain will not be concentrated on those corner areas of the cutouts 21b, thereby minimizing the possibility of the plastic deformation taking place. In addition, since no strain concentrate on the corner areas of the cutouts 21b as hereinabove described, variation in distribution of the strain at a portion of the strain generating member 21, to which a detector, that is, the strain sensor 22 is fitted, can be minimized and, therefore, the influence brought about by the mounting position of the strain sensor 22 on the output signal of the strain sensor 22 can be minimized. In this way, the load can be estimated with further high accuracy.

When the detected load obtained from the sensor equipped wheel support bearing assembly of the construction described hereinbefore is used in vehicle control in the automotive vehicle, contribution can be made to the stabilized travel of the automotive vehicle. Also, when this sensor equipped wheel support bearing assembly is used, the load sensor can be snugly and neatly installed in the automotive vehicle, resulting in the excellent productivity with the cost reduced.

In the embodiment hereinbefore described, those peripheral portions of the vehicle body fitting flange 1a of the outer member 1, serving as the stationary member, where the bolt hole 14 for connection with the knuckle 16 is defined at the plurality of the circumferential locations of the vehicle body fitting flange 1a, have been shown and described as forming the protruding lugs 1aa each extending radially outwardly beyond the remaining portion of the vehicle body fitting flange 1a. Since the two contact fixing segments 21a of the strain generating member 21 in the sensor unit 20 are positioned intermediate between the neighboring protruding lugs 1aa, the strain generating member 21 can be arranged at a position spaced from the protruding lugs 1aa, which constitute a cause of the hysteresis, and, therefore, the hysteresis appearing in the output signal of the strain sensor 22 can be correspondingly reduced, resulting in estimation of the load with high accuracy.

Also, since in the embodiment hereinbefore described, the sensor unit 20 is arranged at the axial position, which is to be the perimeter of one of the rolling surfaces 3 in the outer member 1 that is positioned in the outboard row, that is, at the site where a relatively large space for installation is available and the amount of deformation caused as a result of transmission of the tire working force to the outer member 1 through the rolling elements 5, the detecting sensitivity can be increased to allow the load to be estimated with high accuracy.

In addition, since in the embodiment hereinbefore described, the sensor unit 20 is provided at the top, bottom, left and right surface area of the outer diametric surface of the outer member 1 which serves as the stationary member, the load can be estimated with high accuracy under any loading condition. In other words, since if the load acting in a certain direction increases, a portion where the rolling elements 5 contact the rolling surface 3 and a portion where the rolling elements 5 do not contact the rolling surface 3 appear at a 180° phase difference, positioning of the sensor unit 20 in that certain direction at the 180° phase difference is effective to allow the load, which is applied to the outer member 1 through the rolling elements 5, to be transmitted inevitably to either one of the sensor units 20 and, therefore, such load can be detected by the strain sensor 22.

It is to be noted that in the embodiment hereinabove described, the following parameters are not specifically limited.

The number and the place of the sensor units 20 installed, and the number of each of the contact fixing segments 21a, the strain sensors 22 and the cutouts 21b.

The shape of and the manner of fixing (bonding or welding) the sensor unit 20 and the orientation of the sensor unit 20 fixed (the strain appearing in the axial direction may be detected).

Figure 7:
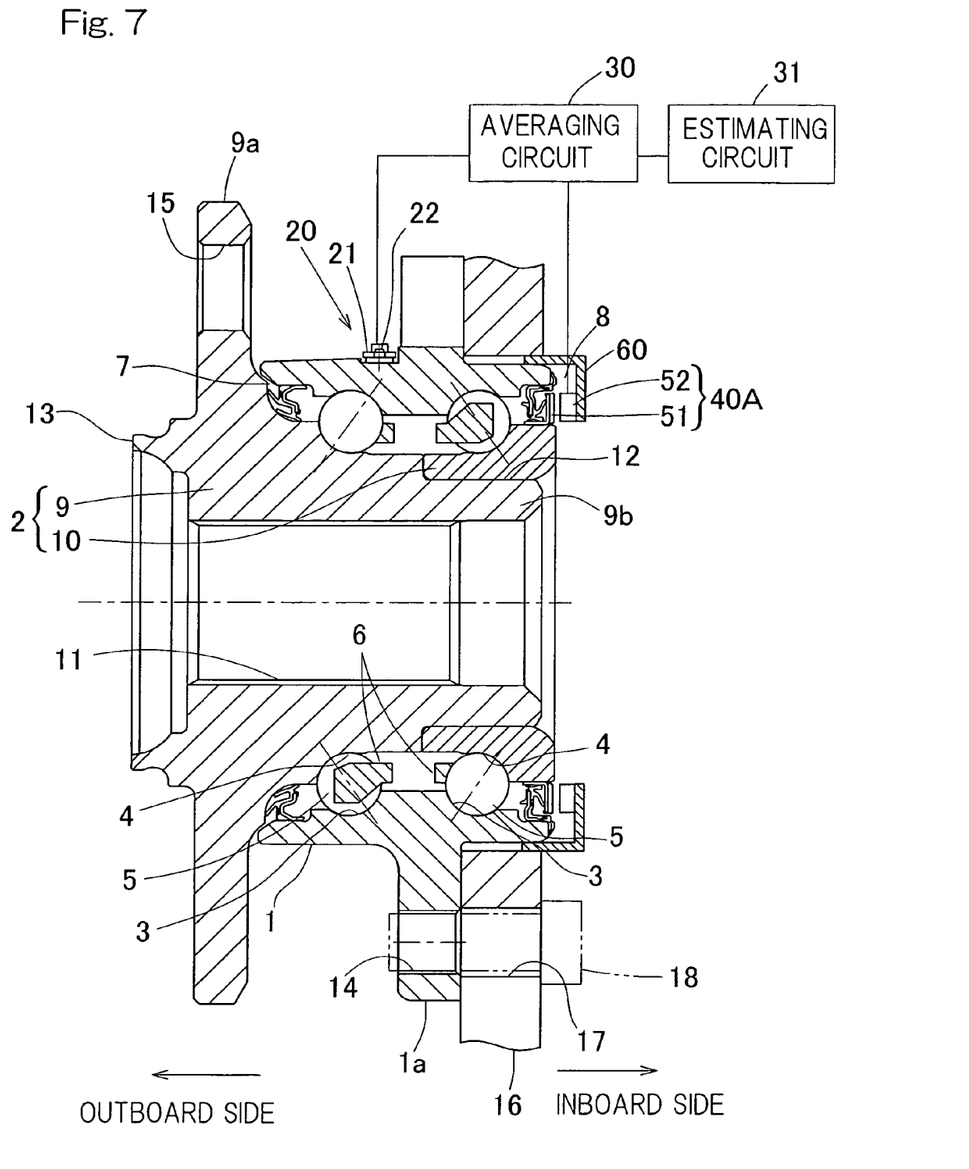
FIG. 7 is a diagram including a sectional view of the sensor equipped wheel support bearing assembly according to a second embodiment of the present invention and a block diagram of a conceptual construction of the detecting system therefor.
Figure 8:
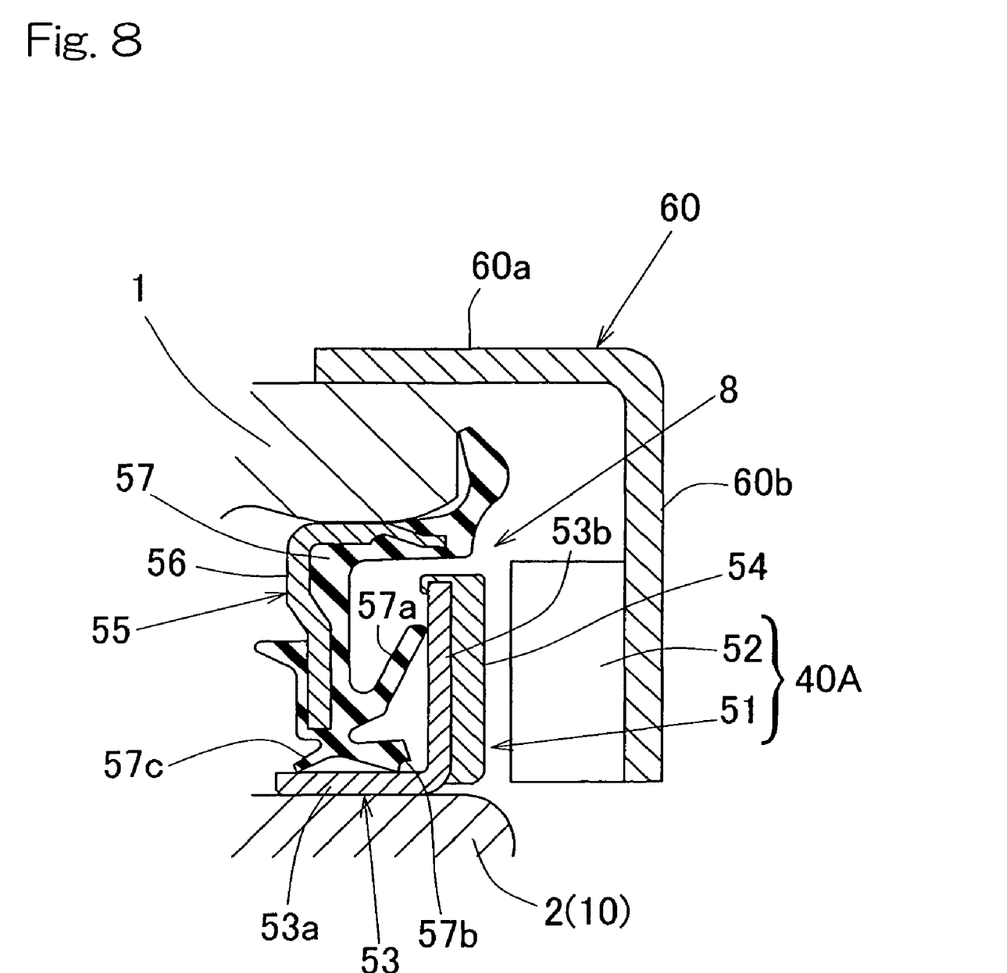
FIG. 8 is an enlarged top plan view showing an example of disposition of a rotation detecting device employed in the sensor equipped wheel support bearing assembly.

FIGS. 7 and 8 illustrate a second embodiment of the present invention. The sensor equipped wheel support bearing assembly shown therein employs as the rotation detecting device, a sensor (an axle rotation sensor) 40A for use in an anti-lock brake system in place of the radial type rotation detector 40 which has been shown in FIGS. 1 to 6C and described in connection with the foregoing first embodiment with reference thereto. This sensor 40A is an axial type rotation detector comprised of a magnetic encoder 51, which is concurrently used in a slinger of the inboard sealing unit 8, and a magnetic sensor 52 opposed axially to this magnetic encoder 51. In other words, the sealing unit 8 referred to above is made up of an annular elastic sealing plate 55 and the magnetic encoder 51, which is a slinger, which are fitted respectively to the outer member 1 and the inner member 2. The magnetic encoder 51 is of a structure, in which a multipolar magnet 54 formed by bonding a rubber magnet by vulcanization to an outwardly oriented surface of an upright plate portion 53b of a magnetic encoder core metal 53 of an L-sectioned configuration mounted on the outer peripheral surface of the inner member 2. The multipolar magnet 54 is an annular member having a plurality of magnetic poles N and S arranged in a direction circumferentially thereof. The elastic sealing plate 55 referred to above is of a type in which an elastic element 57 is fixed to an annular core metal 56. This core metal 56 is rendered to be of a reversed L-sectioned shape that is opposed axially to the magnetic encoder 51. The elastic element 57 includes a side sealing lip 57a, having a tip thereof held in contact with the upright plate portion 53b of the magnetic encoder core metal 53, and two radial sealing lips 57b, 57c having their respective tips held in contact with a cylindrical portion 53a of the magnetic encoder core metal 53.

The magnetic sensor 52 is fitted to the outer member 1 through a metal ring 60. This metal ring 60 is rendered to be of a reversed L-sectioned shape including a cylindrical portion 60a, press-fitted in and, therefore, fitted to the outer peripheral surface of the outer member 1, and a collar portion 60b extending radially inwardly from an inboard end of this cylindrical portion 60a, and the magnetic sensor 52 is provided in an inwardly oriented surface of the collar 60b, which is axially opposed to the multipolar magnet 54 of the magnetic encoder 51. Other structural features are similar to those shown in and described with reference to FIGS. 1 to 6C in connection with the first embodiment of the present invention.

Since in this embodiment, the sensor 40A for use in the anti-lock brake system is employed as the rotation detecting device for detecting the rotation of the inner member 2, the process of averaging the output signal of the sensor unit can be performed by the averaging circuit 30 with no need to employ any extra rotation detecting device.

Figure 9:
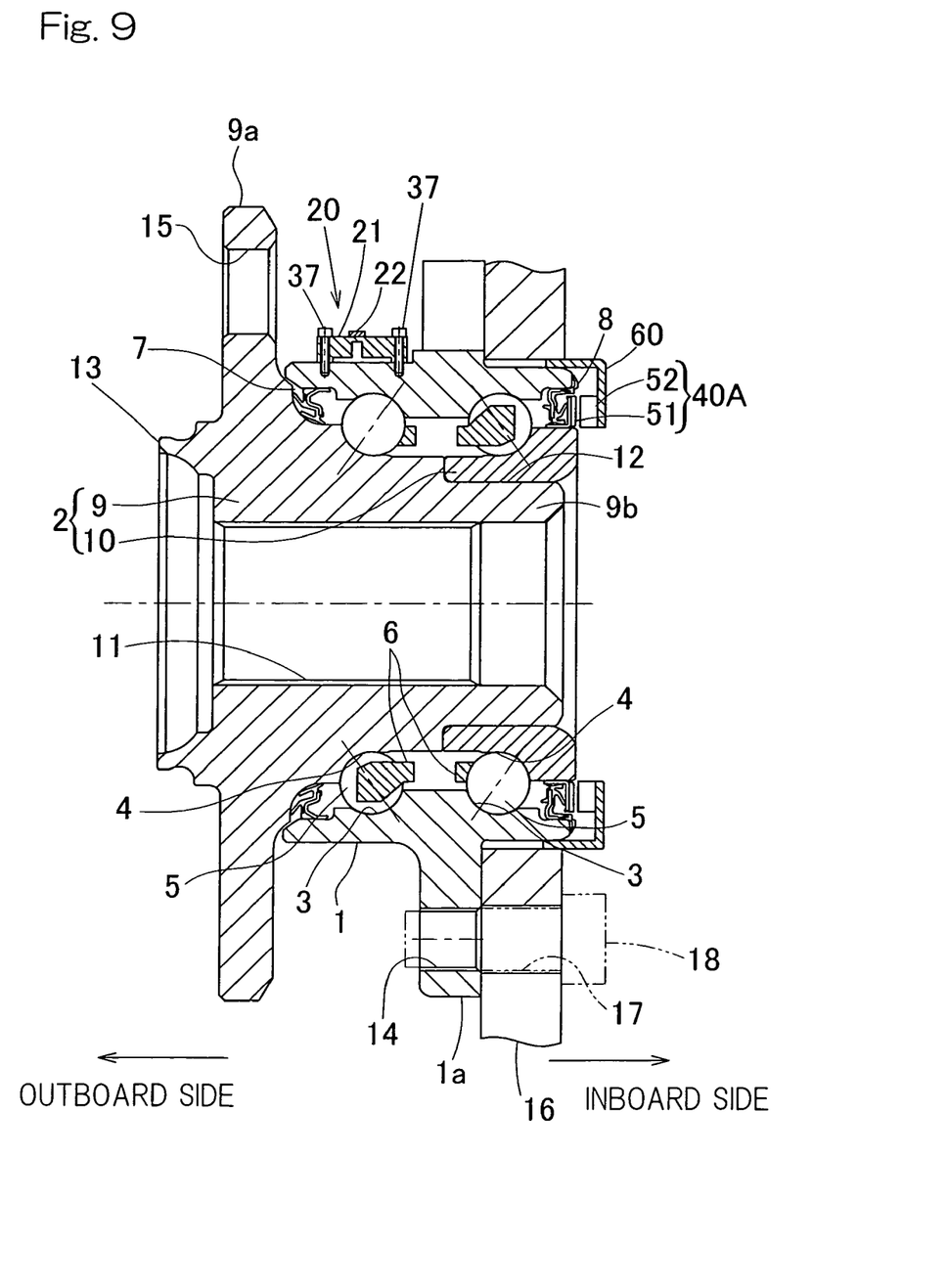
FIG. 9 is a sectional view showing the sensor equipped wheel support bearing assembly according to a third embodiment of the present invention.
Figure 10:
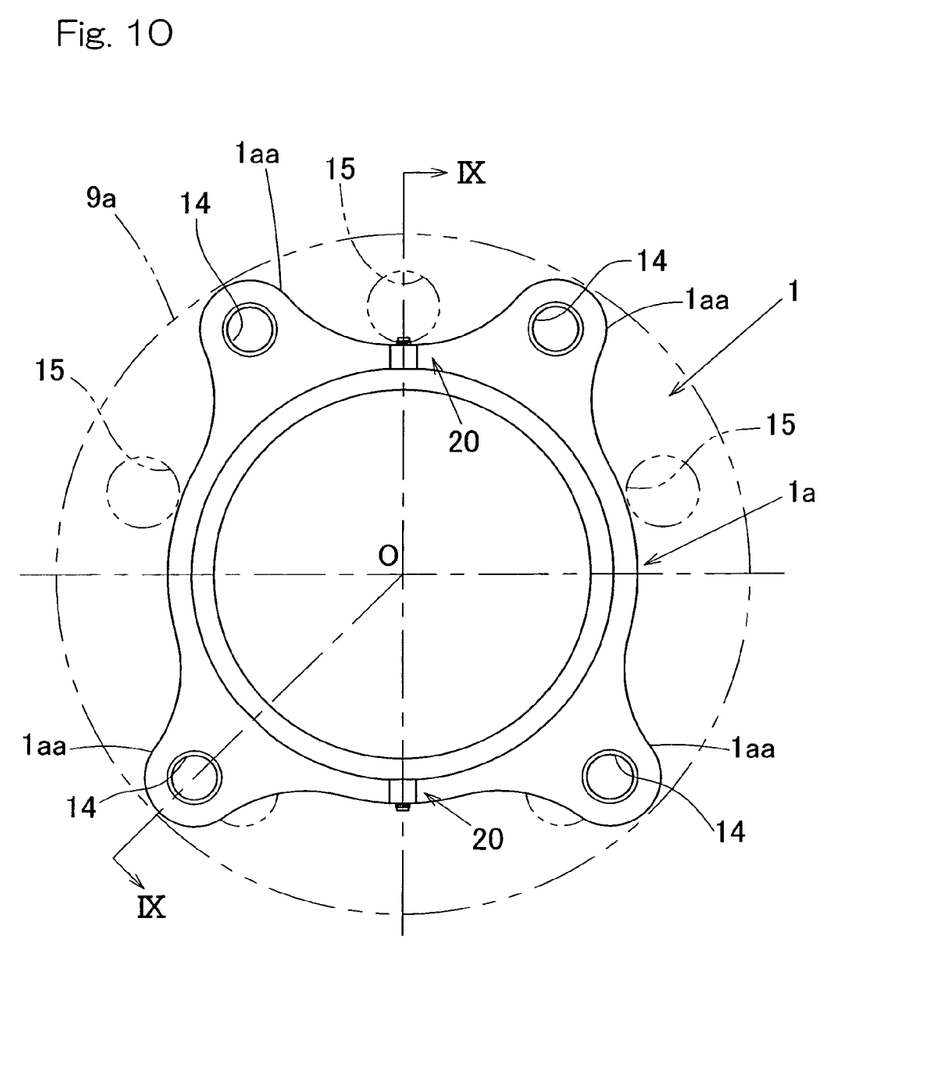
FIG. 10 is a front elevational view showing the outer member of the sensor equipped wheel support bearing assembly as viewed from the outboard side.
Figure 11:
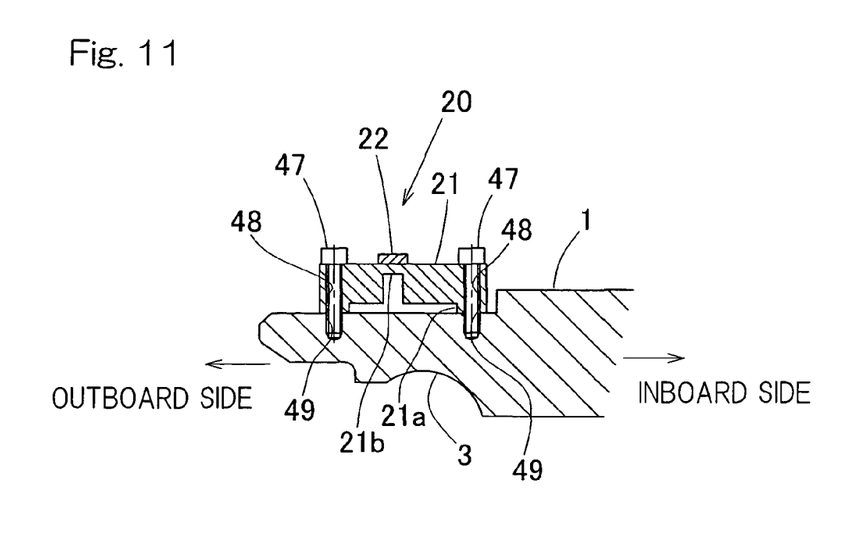
FIG. 11 is an enlarged sectional view showing the sensor unit employed in the sensor equipped wheel support bearing assembly.

FIGS. 9 to 11 illustrate a third embodiment of the present invention. The sensor equipped wheel support bearing assembly shown therein is similar to that shown in and described with reference to FIGS. 7 and 8 in connection with the second embodiment, but differs therefrom in that the sensor unit 20 is so constructed as hereinafter described in detail. Even in this case, the sensor unit 20 is made up of the strain generating member 21 and the strain sensor 22 fitted to the strain generating member 21 for detecting the strain appearing in the strain generating member 21 as shown in FIG. 11 in an enlarged sectional representation. The strain generating member 21 includes at its opposite ends, the two contact fixing segments 21a protruding towards an inner surface opposed to the outer diametric surface of the outer member 1 and is fixed to the outer member 1 with the contact fixing segments 21a held in contact with the outer diametric surface of the outer member 1. One of the contact fixing segments 21a is arranged at the axial position, which is to be a perimeter of the rolling surface 3 of the outboard row in the outer member and the other of the contact fixing segments 21a is arranged at a position on the outboard side of this axial position, and those contact fixing segments 21a are arranged at the respective positions of the same phase relative to each other in the circumferential direction of the outer member 1. In other words, the sensor unit 20 is so arranged on the outer diametric surface of the outer member 1 that the two contact fixing segments 21a of the strain generating member 21 thereof can assume the same circumferential positions of the outer member 1, which serves as the stationary member, and spaced axially from each other. The term "perimeter of the outboard row of the rolling surface 3" referred to above and hereinafter is intended to mean a region extending from a position intermediate between the rolling surfaces 3 on the inboard and outboard sides to a position where the rolling surface 3 on the outboard side is formed. Even in this case, in order to fix the sensor unit 20 to the outer diametric surface of the outer member 1 in a stabilized fashion, those portions of the outer diametric surface of the outer member 1, where the respective spacer 23 may be fixed in contact therewith, are formed as flat surface areas.

Also, that intermediate portion of the strain generating member 21 is formed with one cutout 21b open towards the inner surface. The strain sensor 22 is pasted to a site of the strain generating member 21, where the strain is large relative to the load acting in the various directions. In the instance as shown, for that site, a position adjacent the cutout 21b, more specifically a position on one side adjacent an outer surface of the strain generating member 21 and on a rear side of the cutout 21b is selected and, accordingly, the strain sensor 22 can detect the strain appearing in the vicinity of the cutout 21b.

The two contact fixing segments 21a of the strain generating member 21 are fixed to the outer diametric surface of the outer member 1 by means of respective bolts 47 then fastened into the outer diametric surface of the outer member 1. More specifically, those bolts 47 are threaded into respective bolt holes 49, defined in an outer peripheral portion of the outer member 1, after having been passed through respective radially extending bolt insertion holes 48 defined in the associated contact fixing segments 21a. It is to be noted that as a method of fixing the contact fixing segments 21a, the use may be made of a bonding agent or the like other than the use of the bolts 47. At a site other than the contact fixing segments 21 of the strain generating member 21, a gap is formed between the strain generating member 21 and the outer diametric surface of the outer member 1. Other structural features are similar to those shown and described with reference to FIGS. 7 and 8 in connection with the second embodiment of the present invention. It is to be noted that FIG. 9 is a cross-sectional representation taken along the line IX-IX in FIG. 10 showing a front elevational view of the outer member 1 of the wheel support bearing assembly as viewed from the outboard side. It is also to be noted that in this embodiment, the two sensor units 20 arranged at the left and right surface areas of the outer diametric surface of the outer member 1 are not shown for the sake of brevity. Other structural features are similar to those shown and described with reference to FIGS. 7 and 8 in connection with the second embodiment of the present invention.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to a vehicle body structure, which comprises:
    an outer member having an inner periphery formed with a plurality of rolling surfaces;
    an inner member having an outer periphery formed with rolling surfaces opposed to the rolling surfaces of the outer member;
    a plurality of rows of rolling elements interposed between the respective opposed rolling surfaces defined in the outer member and the inner member;
    a load detecting device provided in one of the outer and inner members that serves as a stationary member for detecting a load imposed on the wheel support bearing assembly;
    a rotation detecting device for detecting a rotation of the other of the outer and inner members that serves as a rotating member;
    an averaging circuit for calculating a rotational speed of the rotating member from an output signal of the rotation detecting device, determining from the calculated rotational speed, a time period required for the rolling elements to revolve a pitch of arrangement of the rolling elements to thereby calculate an average value of an output signal of the load detecting device during the time period; and
    an estimating circuit for estimating from the calculated average value of the averaging circuit, a load acting on a tire tread surface or a load acting on the wheel support bearing assembly.

2. The sensor equipped wheel support bearing assembly as claimed in claim 1, wherein the rotation detecting device includes a sensor for use in an anti-lock brake system.

3. The sensor equipped wheel support bearing assembly as claimed in claim 1, wherein the load detecting device includes a sensor unit, made up of a strain generating member, having two or more contact fixing segments fixed to the stationary member in contact therewith, and a strain sensor fitted to the strain generating member for detecting a strain occurring in the strain generating member, and wherein the contact fixing segments are provided in an outer diametric surface of the stationary member so as to assume the same dimensions in a direction axially thereof.

4. The sensor equipped wheel support bearing assembly as claimed in claim 3, wherein the strain generating member is in the form of a thin plate member having, when viewed from top, a generally strip shape of a uniform width or a generally strip shape with its opposite side edge portions each formed with a respective cutouts.

5. The sensor equipped wheel support bearing assembly as claimed in claim 3, wherein the sensor unit is arranged at top, bottom, left and right surface areas of an outer diametric surface of the stationary member, which assume respectively top, bottom, left and right positions relative to a tire tread surface.

6. The sensor equipped wheel support bearing assembly as claimed in claim 3, wherein a distance between the neighboring contact segments is smaller than the pitch of arrangement of the rolling elements.

* * * * *